INVENTORS
CORNELIUS OTTO JONKERS
ARIE KUIPERS
BY
Mason, Mason & Albright
Attorneys Oct. 6, 1964  C. O. JONKERS ETAL  3,151,444
HYDRAULIC TRANSMISSION SYSTEMS
Filed March 29, 1961  2 Sheets-Sheet 2
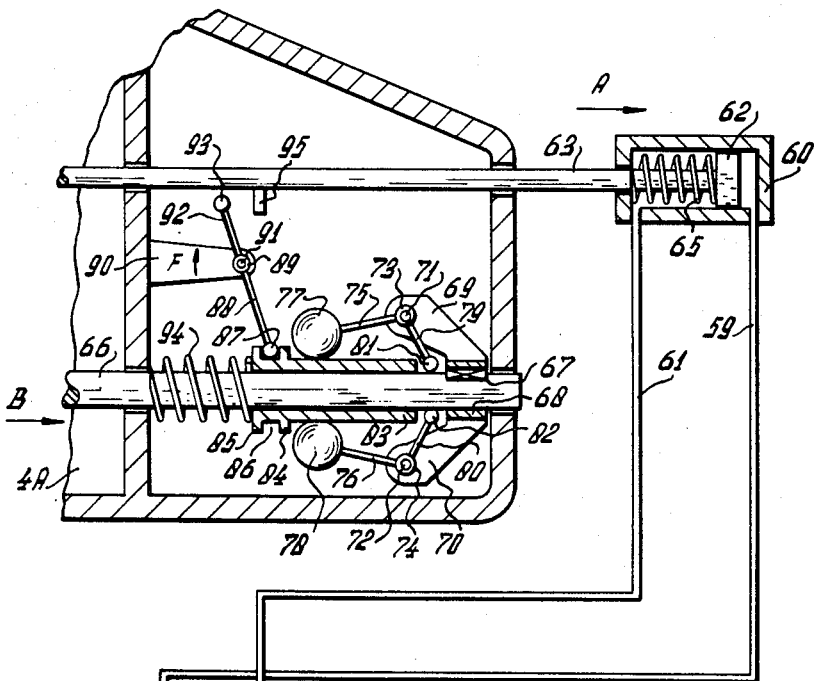
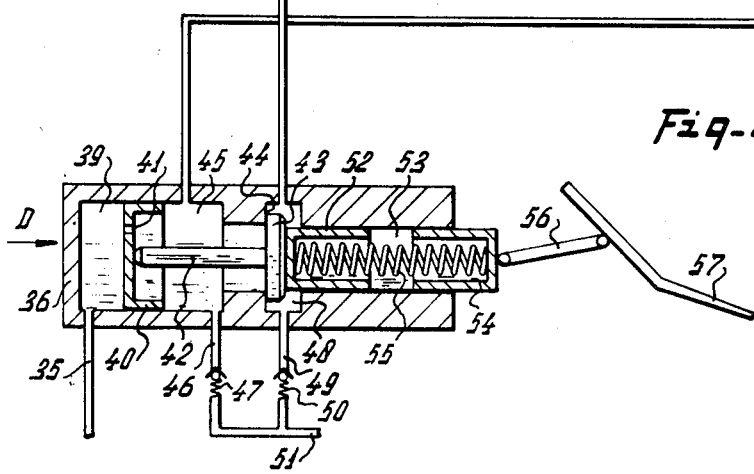
Fig-2-
INVENTORS
CORNELIUS OTTO JONKERS
ARIE KUIPERS
BY
Mason, Mason & Albright
Attorneys

United States Patent Office 3,151,444
Patented Oct. 6, 1964

3,151,444
HYDRAULIC TRANSMISSION SYSTEMS
Cornelius Otto Jonkers, Delft, and Arie Kuipers, Schiedam, Netherlands, assignors to C. van der Lely N.V., Maasland, Netherlands, a limited-liability company of the Netherlands
Filed Mar. 29, 1961, Ser. No. 99,139
Claims priority, application Netherlands Apr. 14, 1960
7 Claims. (Cl. 60—12)

This invention relates to a hydraulic transmission system.

According to the present invention, there is provided a hydraulic transmission system for transmitting power from an engine or other source of rotational energy to a mechanism to be driven thereby, the system including a hydrodynamic torque converter having an input shaft for connection to the engine or the like and an output shaft for connection to said mechanism, there being regulating means for regulating the speed of the engine or the like, said means being arranged to be driven from said output shaft and being such as to adjust the speed of the engine or the like in response to variations in speed of the output shaft, whereby the speed of said output shaft is kept substantially constant.

For a better understanding of the invention and to show how the same may be carried into effect, reference will now be made by way of example to the accompanying drawing, in which:

FIGURE 2 is, on an enlarged scale, a section of a part of the system.

Figure 1:
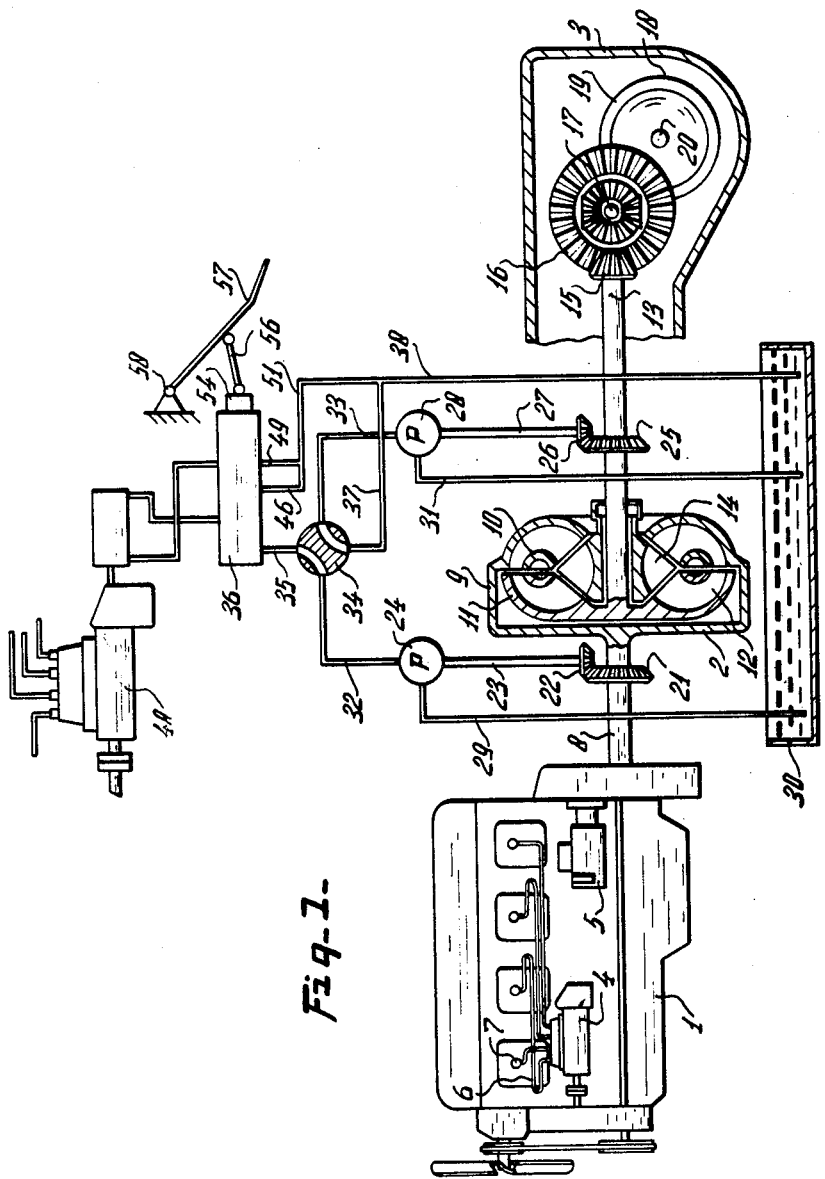
FIGURE 1 is a partly-sectioned diagram of a hydraulic transmission system.

As shown in FIGURE 1, variable speed prime mover comprising an engine 1 is arranged to drive a mechanism 3 through a hydrodynamic, oil-filled torque converter 2. The engine 1 is a diesel engine of a type known per se, having throttle means comprising a fuel pump 4 which communicates via fuel pipes 6 with injectors 7 which spray fuel into the cylinders. The engine has a conventional starting motor 5. For the sake of clarity, the fuel pump 4 is shown again in FIGURE 1 on an enlarged scale at 4A, so that its connection with the various parts of the system is more clearly shown.

The engine 1 is connected by an output shaft 8 to a housing 9 of the torque converter 2. Impeller blades 10 are secured to the inner side of the housing 9. A second housing 11, in which runner blades 12 are arranged, is connected by a shaft 13 to the driven mechanism 3. The torque converter 2 also includes reactor blades 14. The two housings 9 and 11, together with their respective blades 10 and 12, are rotatable relative to each other. The driven mechanism 3 is shown in FIGURE 1 as a section of part of a vehicle. A pinion 15 is secured to the free end of the shaft 13, and the pinion is arranged to drive a crown wheel 16. The crown wheel 16 is connected with a shaft 17 which is coupled to a shaft 20 by suitable gear wheels, such as 18 and 19. The shaft 20 is connected to the driving wheels of the vehicle, these wheels not being shown in FIGURE 1.

A gear wheel 21 is fixed to the shaft 8 and is arranged to drive a pump 24 via a second gear wheel 22 and a shaft 23. Similarly, a gear wheel 25 is fixed to the shaft 13 and is arranged to drive a pump 28 via a gear wheel 26 and a shaft 27. The pump 24 communicates through a pipe 29 with a supply vessel 30 which contains suitable liquid, e.g. oil. The pump 28 also communicates with the supply vessel 30 through a pipe 31. Pressure pipes 32 and 33 connect the pumps 24 and 28, respectively, to a control valve 34. When the control valve is in the position shown in FIGURE 1, the liquid supplied by the pump 24 flows through the control valve 34 and a pipe 35 to a valve box 36. The liquid supplied by the pump 28 flows through the control valve 34 and a pipe 37 to a return pipe 38, which communicates with the supply vessel 30.

As may be seen from FIGURE 2, which shows the valve box 36 in section on an enlarged scale, the pipe 35 communicates with a space 39 in the valve box 36. A piston 40 is accommodated within the space 39 and is arranged to slide therein. A hole 41 is formed through the piston 40 to establish a connection between the space 39 on one side thereof and a space 45 on the other side thereof. A valve stem 42 bears on that side of the piston 40 which is remote from the space with which the pipe 35 communicates. The valve stem 42 forms part of a valve having a head 43. In the position shown in FIGURE 2, the valve head 43 is in contact with a valve seat 44. A pipe 46 leads from the space 45 between the piston 40 and the valve head 43, the pipe 46 accommodating a return valve 47 which is arranged to open at a predetermined excess of pressure in the space 45 over that on the other side of the valve 47. The valve head 43 is accommodated within a space 48 and a pipe 49 emerges from this space and is provided with a return valve 50 similar to the return valve 47. Thus the pipe 46 and 49 communicate via a further pipe 51 with the return pipe 38 (see FIGURE 1).

Pistons 52 and 54 are arranged to slide within a cylindrical space 53 formed in the valve box 36, the piston 52 bearing against the valve head 43. A compression spring 55 is provided between the pistons 52 and 54 in order to tend to keep them apart. The piston 54 is coupled with the aid of a rod 56 to a control member 57 which is pivoted to a fixed point 58 (see FIGURE 1). The connections of the rod 56 to the piston 54 and to the control member 57, are pivotal.

The space 45 in the valve box 36 communicates via a pipe 59 with a cylinder 60, and the space 48 of the valve box 36 also communicates with the cylinder 60 via a pipe 61. A piston 62 is housed within the cylinder 60, and the pipes 59 and 61 open one on each side of the piston 62. A control rod 63 is fastened to the piston 62, the control rod being coupled in known manner to the plungers of the fuel pump 4 in order to control the rate of flow of fuel. A compression spring 65 is arranged around the control rod 63 and tends to urge the piston 62 in the direction indicated by the arrow A in FIGURE 2.

A shaft 66 is supported within the housing of the fuel pump 4. This shaft 66 is driven by the engine 1 and has arranged thereon, with the aid of a key 67, a hub 68. To this hub are fastened two arms 69 and 70. Pivot pins 71 and 72 are arranged on the arms 69 and 70, respectively, so as to be spaced equally from the shaft 66 and to be at right angles thereto. Sleeves 73 and 74 are mounted on the pins 71 and 72, respectively, so as to be freely rotatable, and the rods 75 and 76, respectively, are secured to the sleeves 73 and 74. Spherical weights 77 and 78 are arranged on the free ends of the rods 75 and 76, respectively; rods 79 and 80 are secured to the sleeves 73 and 74, respectively, and balls 81 and 82 are fastened to the free ends of the rods. A sleeve 83 is mounted on the shaft 66 so as to be slidable along the shaft, the sleeve 83 being formed with two integral collars 84 and 85 between which a groove 86 is left. A ball 87 is accommodated within the groove 86 and has secured thereto one end of a rod 88. The other end of the rod is fastened to a sleeve 89 which is freely rotatable about a pivot pin 91 fastened to a support 90, which in turn is fastened to a fixed part of the housing of the fuel pump 4. A rod 92 is secured to the sleeve 89 so as to be aligned with the rod 88, a ball 93 being fixed at the free end of the rod 92. A compression spring 94 is arranged around the shaft 66 between the sleeve 83 and a fixed part of the fuel pump housing. The compression spring 94 thus tends to move the sleeve 83 in the direction indicated by the arrow B. The balls 81 and 82 bear on that end of the sleeve 83 which is remote from the spring 94. The control rod 63 has secured thereto a stop 95. The above-described mechanism, accommodated within the housing of the fuel pump, constitutes a mechanical regulator.

The system operates as follows:

The engine 1 is started in known manner with the aid of the starting motor 5. While the engine is running, the output shaft 8 rotates, and this in turn rotates the housing 9 of the hydrodynamic torque converter 2. The impeller blades 10 secured to the housing 9 cause movement in the oil contained within the torque converter, whereby the housing 11 is caused to rotate due to the force exerted on the runner blades 12. The housing 11 is connected to the shaft 13, so that this shaft rotates in order to drive the mechanism 3. During operation, the runner blades 12 may move more slowly than the impeller blades 10, due to the provision of the reactor blades 14, whereby there is torque conversion. Consequently, a certain amount of slip constantly occurs in the torque converter 2.

When the control valve 34 occupies the position shown in FIGURE 1, the pump 24 pumps liquid from the supply vessel 30 to the valve box 36, via the pipes 29, 32 and 35. Since the pump 24 is driven from the output shaft 8 of the engine 1, the rate of displacement of liquid by the pump is dependent upon the speed of revolution of the engine. The liquid displaced by the pump 24 flows into the space 39 of the valve box 36 and through the hole 41 in the piston 40 into the space 45. When the liquid flows through the hole 41, the pressure of the liquid is reduced, so that the pressure in the space 39 exceeds that in the space 45, the piston being thus urged in the direction indicated by the arrow D in FIGURE 2. This movement in the direction D is opposed by the compression in the spring 55. The magnitude of the compression in the spring is adjustable by movement of the piston 54 with the aid of the control member 57. The pressure in the space 45 is kept at constant level during operation by the valve 47, which opens when a predetermined pressure is reached in order to return excess liquid to the supply vessel 30 via the pipes 46, 51 and 38. The pressure in the space 45 causes movement of liquid through the pipe 59 into the cylinder 60, so that the liquid exerts a force on the piston 62. This tends to move the control rod 63 in the direction opposite that of the arrow A. The control rod 63 is coupled with the fuel pump so that, when the control rod starts moving the direction opposite that of the arrow A, an increased quantity of fuel is supplied to the engine 1.

As the piston 40 moves in the direction D, it moves the valve stem 42 and head 43 in the same direction so that a gap is formed between the valve head 43 and the valve seat 44. Liquid will then pass from the space 45 through the gap between the valve head and valve seat into the space 48, there being a decrease in pressure during such flow of liquid. The liquid pressure in the space 48 will, in general, be lower than the pressure in the space 45, and the maximum pressure in the space 48 is limited during operation by the valve 50 which opens in response to excess pressure. The pressure in the space 48 causes liquid to flow through the pipe 61 to the cylinder 60 where it exerts a force on the piston 62. It will be seen from FIGURE 2 that the liquid pressure caused by the liquid passing through the pipe 61, together with the pressure of the spring 65, tends to move the piston 62 in the direction of the arrow A. In normal operation, there will be a state of equilibrium between the pressures of either side of the piston 62. When the engine speed increases, the speeds of rotation of the output shaft 8 and pump-driving shaft 23 increase, so that the pump 24 displaces a greater quantity of liquid in a given time. The pressure in the space 39 will thus rise and, with a fixed position of the control member 57, the valve 42, 43 is opened further. The pressure in the space 48, and in the space of the cylinder 60 communicating therewith, thus increases, so that the control rod 63 is displaced slightly in the direction of the arrow A. The fuel pump is adjusted by this displacement, so that a smaller quantity of fuel is fed to the engine 1, and the engine will thus slow down. Consequently, the pump 24 supplies less liquid to the valve box 36 so that the pressure in the space 39 decreases and the valve 42, 43 is urged in the direction opposite that of the arrow D by the spring 55. Thus the pressure in the space 48 is decreased and the liquid contained in the space of the cylinder 60 which communicates with the space 45, again causes the control rod to move in the direction opposite that of the arrow A. Therefore, with a fixed position of the control member 57, an equilibrium will be established so that the engine rotates at substantially constant speed. When the position of the control member 57 is changed, the compression in the spring 55 is varied. A new state of equilibrium is then established. If on the one hand, the compression in the spring is increased by the control member 57, the gap between the valve head 43 and valve seat 44 is decreased, so that less liquid passes through the gap and the pressure difference between the spaces 45 and 48 increases. If on the other hand, the compression in the spring is decreased, the gap between the valve head 43 and the valve seat 44 increases so that the pressure difference between the spaces 45 and 48 decreases. In this manner the piston 62 and the control rod 63 connected thereto reach a new state of equilibrium, so that the speed of revolution of the engine 1 is changed. The valve box 36 and the cylinder 60, together with the mechanism contained therein, constitute a hydraulic regulator to which liquid is fed by the pump 24.

When the control valve 34 is arranged as shown in FIGURE 1, liquid pumped through the pipe 31 from the supply vessel 30 by the pump 28, flows through the pipes 33, 37 and 38, and is thus returned to the supply vessel 30.

When the control valve 34 is turned through 90°, the pipes 32 and 37 are connected, and the pipes 33 and 35 are connected. Therefore, as the engine 1 rotates, the liquid pumped by the pump 24 from the supply vessel 30 passes through the pipes 32, 37 and 38 back to the supply vessel. The liquid pumped by the pump 28 flows through the pipes 33 and 35 to the valve box 36. The pump 28 is driven from the shaft 13 via the gear wheels 25 and 26 and the shaft 27. If the speed of revolution of the shaft 13 is constant, the quantity of liquid displaced by the pump 28 is also constant, and in the manner described above a given state of equilibrium is established for the control rod 63, whereby the engine speed is kept constant. However, if on the one hand the rate of revolution of the shaft 13 increases, for example owing to a decrease in load on the driven mechanism 3, the quantity of liquid displaced by the pump 28 also increases whereby the control rod 63 is displaced so that, in the manner described above, a smaller quantity of fuel is fed to the engine by the fuel pump and the rate of revolution of the engine 1 is decreased. The output shaft 8 and the housing 9 of the torque converter 2, rotate more slowly, and hence the housing 11 and the shaft 13 also rotate more slowly. On the other hand, if the rate of revolution of the driven shaft 13 decreases, for example during an increase in load on the driven mechanism 3, the quantity of liquid displaced by the pump 28 decreases so that the pressure in the space 39 is reduced. Therefore, in the manner described above, the control rod 63 is moved in the direction opposite that of the arrow A and the quantity of fuel fed to the engine is thereby increased, so that the engine speed is increased, and the speed of rotation of the driven shaft 13 is correspondingly increased.

It will be seen that the position of the control rod 63 is governed by the hydraulic regulator formed by the valve box 36 and the cylinder 60, which regulator is fed with liquid by the pump 28, whereby the speed of rotation of the driven mechanism 3 is substantially constant, the speed being, however, adjustable by the control member 57.

The mechanical regulator formed by the mechanism contained within the fuel pump housing and driven by the shaft 66, serves to limit the maximum speed of rotation of the engine 1. The shaft 66 is rotated during operation so that the spherical weights 77 and 78 of the mechanism are rotated about the axis of the shaft 66. The resulting centrifugal force exerted on the weights tends to move them outwardly from the shaft 66, the weights turning about the axis of the pins 71 and 72 by virtue of the connection with the sleeves 73 and 74 respectively. The balls 81 and 82 are correspondingly moved in the direction opposite that of the arrow B, so that they tend to move the sleeve 83 in the direction opposite that of the arrow B. This movement of the sleeve is opposed by the compression spring 94. However, when the speed of revolution of the shaft 66 exceeds a given limit, the sleeve 83 is moved in the direction opposite that of the arrow B against the action of the spring 94. The ball 87 located in the groove 86 is correspondingly moved, whereby the rods 88 and 92 are turned about the axis of the pin 91 in the direction of the arrow F. The ball 93 secured to the rod 92 contacts the stop 95 and the control rod 63 is moved in the direction of the arrow A. This movement of the control rod 63 reduces the quantity of fuel supplied by fuel pump 4 to the engine, and the engine speed is reduced. In this manner, the mechanical regulator limits the maximum speed of the engine.

The system described above is particularly applicable to agricultural tractors or similar vehicles. In agricultural operation, it is often desirable to travel at a constant speed over the ground during operation, whereas the required draw-bar horse-power varies considerably due to uneven distribution of crop, uneven ground, etc. It has previously been known to provide on agricultural tractors, a single regulator which keeps the speed of revolution of the tractor engine constant at a fixed position of a control member (corresponding to the control member 57 in the above-described system). In this case, the speed of travel over the ground varies, depending upon the load on the driven mechanism, since if the load on the driven mechanism is increased, a greater slip is produced within the hydrodynamic torque converter. However, if the regulator for the speed of revolution of the engine is coupled with the driven part of the arrangement, the rate of revolution of the engine is varied whereas the rate of revolution of the driven mechanism is kept constant during variations in load on the driven mechanism. In, for example, an agricultural tractor, this means that the speed of travel over the ground remains substantially constant for a given setting of the control member, despite variations in the load.

It may, however, be desired to exert a constant draw-bar horse-power, variations in the travelling speed being less important. In this case, the regulator for the engine speed is driven from the output shaft of the engine so that the engine speed is kept constant and the torque supplied thereby is also kept constant.

As described above, the regulators controlled from the output shaft 8 of the engine and from the driven shaft 13 of the torque converter, are operated hydraulically. It will be apparent, however, that mechanical regulators could be used in place of the described regulators. Also, a single regulator could be used, which regulator may be controlled at will from the output shaft 8 of the engine or from the driven shaft 13 of the torque converter. In place of the diesel engine, a petrol or a steam engine could be used in the arrangement described, the regulators serving the same purpose as with the diesel engine. The arrangement could also be employed with a change-speed gear mounted between the engine 1 and the torque converter 2, or between the torque converter 2 and the driven mechanism 3.

What we claim is:

1. A hydraulic transmission system for transmitting power from a variable speed prime mover to a mechanism to be driven thereby, a hydrodynamic torque converter included in said system, said hydrodynamic torque converter having an input shaft for connection to said variable prime mover and an output shaft for connection to said mechanism, regulating means including throttle actuation means for regulating the speed of said variable prime mover, said regulating means including first speed sensing means operatively related to said input shaft and second speed sensing means operatively related to said output shaft, said regulating means being arranged whereby said throttle actuation means is optionally actuated through said first sensing means by said input shaft or through said second speed sensing means by said output shaft to adjust the speed of said variable prime mover in response to variations in the speed of the actuating shaft, whereby the speed of siad actuating shaft is kept substantially constant.

2. A system as claimed in claim 1 wherein a first fluid pump driven by said input shaft comprises said first speed sensing means and a second fluid pump driven by said output shaft comprises said second speed sensing means, said regulating means being operated hydraulically optionally by said first fluid pump or by said second fluid pump.

3. A system as claimed in claim 1 wherein a further regulator driven by said variable prime mover is provided for limiting the maximum speed of said variable prime mover.

4. A power plant comprising a variable speed prime mover, throttle means controlling the rate of admission of fuel to said prime mover, a hydrodynamic torque converter driven by said prime mover and provided with a power output shaft, governor means, first speed sensing means operatively related to said prime mover, second speed sensing means operatively connected to said output shaft, throttle actuation means, and selector means operatively associated with said sensing means and included in said governor means, said selection means providing selective connection of said throttle actuation means to said first speed sensing means or to said second speed sensing means to maintain optionally a substantially constant speed of said prime mover or a substantially constant speed of said output shaft.

5. A power plant in accordance with claim 4 which includes a mechanical regulator driven by said prime mover and responsive to the speed thereof, said regulator operatively associated with said throttle means to reduce the admisson of fuel ot said prime mover when the speed of said prime mover exceeds a predetermined rate.

6. A power plant in accordance with claim 4 which includes a control means connected to said governor selectively varying said throttle actuation means.

7. A power plant comprising an internal combustion engine for a vehicle, throttle means controlling the rate of admission of fuel to said internal combustion engine, a hydrodynamic torque converter driven by said internal combustion engine and provided with a power output shaft, governor means, a pair of fluid pumps, one of said pumps driven by said internal combustion engine, the other of said pumps driven by said output shaft, throttle actuation means, and selection means associated with said pumps and incorporated in said governor means, said selection means providing selective connection of said throttle actuation means to said first-mentioned pump or to said second-mentioned pump to maintain optionally a substantially constant speed of said internal combustion engine or a substantially constant speed of said output shaft.

References Cited in the file of this patent
UNITED STATES PATENTS

| | | |
|---|---|---|
| 1,868,130 | Bauer et al. | July 19, 1932 |
| 2,018,616 | Martyrer et al. | Oct. 22, 1935 |
| 2,628,470 | Orton | Feb. 17, 1953 |
| 2,657,918 | Parker | Nov. 3, 1953 |
| 2,721,072 | Zuhn et al. | Oct. 18, 1955 |
| 2,958,999 | Van De Hey | Nov. 8, 1960 |